United States Patent [19]
Nakabayashi et al.

[11] 3,818,178

[45] June 18, 1974

[54] GAS SHIELDED CORE WIRE ELECTRODE

[75] Inventors: Masahiro Nakabayashi, Briarcliff Manor; Rafael Maytin Valle, Bronx, both of N.Y.

[73] Assignee: Union Carbide Corporation, New York, N.Y.

[22] Filed: Mar. 30, 1972

[21] Appl. No.: 239,767

[52] U.S. Cl. .................................. 219/146, 219/137
[51] Int. Cl. ............................................ B23k 11/30
[58] Field of Search ............ 219/146, 145, 137, 74, 219/73; 117/202–207; 148/24, 26

[56] References Cited
UNITED STATES PATENTS

| | | | |
|---|---|---|---|
| 2,951,931 | 9/1960 | Danhier | 219/146 |
| 3,177,340 | 4/1965 | Danhier | 219/146 |
| 3,531,620 | 9/1970 | Arikawa et al. | 219/146 |
| 3,539,765 | 11/1970 | Duttera | 219/146 |
| 3,643,061 | 2/1972 | Duttera | 219/146 |

*Primary Examiner*—J. V. Truhe
*Attorney, Agent, or Firm*—Dominic J. Terminello

[57] ABSTRACT

A core wire electrode for use with a shielding gas, particularly in out-of-position welding, said electrode having a core material containing magnesium and/or magnesium aluminum alloys.

8 Claims, No Drawings

GAS SHIELDED CORE WIRE ELECTRODE

This invention relates to consumable electrodes for electric arc welding and, more particularly, to a cored wire electrode for arc welding with a shielding gas, and most particularly with carbon dioxide shielding gas or carbon dioxide containing shielding gas.

The art of cored wire electrodes includes various types of electrodes for use with or without a shielding medium including gas or flux materials. There are available cored wires for welding with a carbon dioxide shielding gas medium; however, none of the presently available electrodes of this type are entirely satisfactory for out-of-position welding. With presently available electrodes out-of-position welding requires great operator skill in manipulating the electrode in order to hold the molten weld puddle against the forces of gravity acting on the puddle. Another disadvantage of present electrodes is that in order to reduce weld puddle fluidity, operators normally will reduce the arc current, thereby resulting in a transformation from spray-like transfer to globular transfer from the electrode to the work. Globular transfer requires even greater operator skill to manipulate the electrode.

Accordingly, it is the main object of this invention to provide a cored wire for use in out-of-position consumable electrode gas shielded arc welding.

Another object is to provide such an electrode for carbon dioxide shielded arc welding.

Yet another object is to provide an out-of-position cored wire electrode which produces a weld puddle that will tend to remain in place even against the forces of gravity.

These and other objects will become apparent from the following description and examples which are provided to illustrate the concept of the invention.

It has been discovered that in a rutile based cored wire flux system for use with gas shielding the addition of magnesium in element form or as a magnesium-aluminum alloy surprisingly produces a slag which appears to stiffen or become more viscous well above the melting point of the slag and above that of steel. It is postulated that the compound $MgTi_2O_5$ (melting point 1,652°C) is formed in the molten flux solution and precipitates out to stiffen the still molten portion of the slag. This phenomenon is ideally suited for welding in the vertical or overhead positions (out-of-position). It was further discovered that substituting magnesium oxide for magnesium or magnesium aluminum alloys produced unstable arcing condition. Surprisingly, magnesium or magnesium aluminum alloy does not cause arc instability notwithstanding that the magnesium or aluminum converts in the presence of the arc to magnesium oxide or $MgTi_2O_5$ and $Al_2O_3$ respectively because of the oxygen contained in the carbon dioxide shielding atmosphere.

Accordingly, the objects of the invention are achieved in a general way by a consumable wire electrode for use with a gas shielding medium which electrode comprises a hollow sheath of mild steel having a flux core which is about 10 to about 20 weight percent of the total electrode. The core material contain conventional flux materials such as deoxidizers, sodium or potassium bearing arc stabilizers, rutile and iron powder. The novel feature of the invention is the use of from about 1 to about 7 weight percent magnesium or magnesium aluminum alloy in the core material, together with about 3 to about 10 weight percent manganese oxide. The manganese oxide has a beneficial quieting effect on the arc.

The deoxidizers that may be used are any of the conventional deoxidizers and are usually taken from the class of deoxidizers consisting of ferromanganese silicon; ferromanganese; ferrosilicon; zirconium silicon; calcium silicon; ferroaluminum silicon; alkali metals and alkaline earth metals. Ferromanganese silicon and ferromanganese are preferred. Any of the above deoxidizers may be used, provided some silicon is present from one of the ingredients used. The deoxidizer is usually present in an amount of from about 10 to about 30 weight percent.

Iron powder is used as an arc stabilizer and may be present from about 2 to about 40 weight percent. The amount of iron powder is dependent on the core weight percent used. For example, if a very small core is used, it means that more steel sheath is used. Accordingly, less iron powder is needed in the core because the iron is being supplied by the sheath.

A sodium or potassium compound such as sodium fluoride or potassium silicate are used to aid in stabilizing the arc, and are present in the range of from about 0.5 to about 8 weight percent. Calcium fluoride has been found to have an adverse effect on the ability of the electrode of this invention to weld out-of-position.

Rutile ($TiO_2$) is the basis of the flux and is the slag forming ingredient. Rutile should be present in an amount of from about 30 to about 60 weight percent of the core. If much more than about 60 weight percent rutile is used, the slag will become to fluid and the beneficial effect of magnesium or magnesium alloy will be lost.

Magnesium or magnesium aluminum alloy is used in amounts of from 1 to about 7 weight percent. When much more than about 7 weight percent is used, the arc becomes very harsh and creates much spatter. In addition, the slag stiffens too quickly resulting in inclusions in the weld metal. As pointed out above, manganese oxide is used to achieve a soft spatter free arc and it achieves this result when it is present in amounts of from about 3 to 10 weight percent with 1 to 7 weight percent magnesium or magnesium aluminum alloys.

It also has been found that alumina $Al_2O_3$ should be used when the magnesium is added as an alloy of magnesium-alumina. Alumina aids in producing the stiff slag when magnesium aluminum is used. The amount of alumina should be between about 0.5 to about 5.0 weight percent.

The preferred core ratio has been found to be about 10 to about 20 weight percent of the total electrode. It should be obvious to those skilled in the art that as the core ratio changes, the weight percent of the ingredients in the core will, of necessity have to change. The following examples are given by way of illustration of the various core percentages and the compositions thereof, but it should be understood that minor modification may be made thereto, especially with respect to the percentages of materials used based on the core percentage without departing from the spirit and scope of this invention.

EXAMPLE I

A 1/16 inch diameter 18 core weight percent electrode was made with a mild steel sheath. The flux contained the following ingredients in the approximate weight percents given: NaF 1.5; Fe powder 21.5; TiO$_2$ 47; FeMnSi 20; Mg 3; and Mn 0.7. The wire was used to make manual vertical up welds with about 200 to 230 amps at about 23 to 25 volts. The slag stiffened to hold the weld puddle without any special operator skill. Spray transfer was maintained notwithstanding the relatively low current which aided in the ease with which the operator could make the weld.

EXAMPLE II

A 1/16 inch diameter 18 core weight percent electrode was made with a mild steel sheath. The flux contained the following ingredients in the approximate weight percents given: NaF 2; Fe powder 35; TiO$_2$ 35; FeMnSi 15; Mg—Al 4; MnO 5; K$_2$SiO$_4$ 2; and Al$_2$O$_3$ 2. This wire also was used to make manual vertical up welds at about 200 to 230 amps and 23 to 25 volts. The results were similar to those specified in Example I.

EXAMPLE III

In this Example and Examples IV and V, a 1/6 inch diameter 14 core weight percent electrode was made. The flux contained in this case in weight percent; Fe 11.9; TiO$_2$ 45.0; FeMnSi 23.8; MnO 6.4; NaF 2.6; Al—Mg 5.2 K$_2$SiO$_4$ 2.6; and Al$_2$O$_3$ 2.6. Again, a stiff slag was formed and the puddle held without any special operator skill.

EXAMPLE IV

The flux contained in weight percent:
Fe 12.4; TiO$_2$ 45.0; FeMnSi 19.3; MnO 6.4; NaF 2.5; Al—Mg 5.2; K$_2$SiO$_4$ 2.6; Al$_2$O$_3$ 2.6 and FeMn 4.0. This electrode was found to be the preferred electrode because excellent arc stability with high impact property and matching strength level for mild steel application.

EXAMPLE V

In this example, the flux contained in weight percent: Fe 16.4; TiO$_2$ 45.0; FeMnSi 19.3; MnO 6.4; NaF 2.5; Al—Mg 5.2; K$_2$SiO$_4$ 2.6; and Al$_2$O$_3$ 2.6; The same good results were obtained using this wire for manual vertical up welds.

EXAMPLE VI

In this example, a 1/16 inch diameter 12 core weight percent electrode was made. The flux contained in weight percent: NaF 3.0; Fe 2.5; TiO$_2$ 52.5; FeMnSi 22.5; MnO 7.5; Al—Mg 6.0; K$_2$SiO$_4$ 3.0; and Al$_2$O$_3$ 3.0. Manual vertical up welds were made at the same welding conditions recited above with the same good results.

All of these wires were used with a shielding gas of CO$_2$ or 25 percent argon, 75% CO$_2$ at 40 cubic feet/per hour flow. The weld metal properties in all cases were satisfactory. It can be concluded from the above that the invention provides an electrode which can be used out-of-position by an operator of ordinary skill to achieve welds which heretofore were not possible with CO$_2$ shielded core wire welding.

What is claimed is:

1. A consumable wire electrode for gas shielded electric arc welding comprising
a hollow sheath of mild steel and a flux core comprised essentially of from about 10 to about 20 weight percent of the total electrode, said core material containing deoxidizers, iron powder, a sodium or potassium bearing arc stabilizer, rutile, about 1 to about 7 weight percent of core of at least one of the metals taken from the class consisting of magnesium and magnesium-aluminum alloys and about 3 to 10 weight percent of core of manganese oxide.

2. A consumable wire electrode for gas shielded electric arc welding comprising
a hollow sheath of mild steel and a flux core consisting essentially of from 10 to 30 weight percent of at least one deoxidizer taken from the class consisting of ferromanganese-silicon, ferromanganese, ferrosilicon, zirconiumsilicon, calcium-silicon, ferroaluminum-silicon, alkali metals and alkaline earth metals with the proviso that some silicon be present; from about 2 to about 40 weight percent iron powder; from about 0.5 to about 8.0 weight percent of at least one arc stabilizer taken from the class of arc stabilizers consisting of sodium and potassium bearing compounds; about 30 to 60 weight percent rutile; about 1 to about 7 weight percent of at least one of the metals taken from the class consisting of magnesium and magnesium-aluminum alloys; about 3 to 10 weight percent manganese oxide; and about 0.5 to 5.0 weight percent alumina when magnesium-aluminum alloy is used.

3. A consumable wire electrode for gas shielded electric arc welding comprising
a hollow sheath of mild steel and a flux core consisting essentially of from 10 to 25 weight percent FeMn Si; 1 to 7 weight percent FeMn; 2 to about 40 weight percent iron powder; 0.5 to about 3 weight percent sodium fluoride; 0.5 to about 3 weight percent K$_2$SiO$_4$; about 30 to about 60 weight percent rutile; about 1 to about 7 weight percent magnesium-aluminum alloy; about 3 to 10 weight percent manganese-oxide and about 0.5 to 5.0 weight percent alumina.

4. A consumable wire electrode for carbon dioxide containing gas shielded arc welding comprising a hollow sheath of mild steel and a flux core comprising 18 weight percent of the total electrode, said core material consisting essentially of about 2 weight percent NaF; about 35 weight percent Fe powder; about 35 weight percent TiO$_2$; about 15 weight percent FeMnSi; about 4 weight percent Mg—Al (alloy); about 5 weight percent MnO; about 2 weight percent K$_2$SiO$_4$ and about 2 weight percent Al$_2$O$_3$.

5. A consumable wire electrode for carbon dioxide containing gas shielded arc welding comprising a hollow sheath of mild steel and a flux core comprising 14 weight percent of the total electrode, said core material consisting essentially of about 11.9 weight percent Fe powder; 45.0 weight percent TiO$_2$; 23.8 weight percent FeMnSi; 6.4 weight percent MnO; 2.6 weight percent NaF; 5.2 weight percent Al—Mg (alloy); 2.6 weight percent K$_2$SiO$_4$; and 2.6 weight percent Al$_2$O$_3$.

6. A consumable wire electrode for carbon dioxide containing gas shielded arc welding comprising a hollow sheath of mild steel and a flux core comprising 14 weight percent of the total electrode, said core material consisting essentially of about 12.4 weight percent Fe powder; 45.0 weight percent TiO$_2$; 19.3 weight percent FeMnSi; 6.4 weight percent MnO; 2.5 NaF; 5.2 weight percent Al—Mg; 2.6 K$_2$SiO$_4$; 2.6 Al$_2$O$_3$ and 4.0 FeMn.

7. A consumable wire electrode for carbon dioxide containing gas shielded arc welding comprising a hollow sheath of mild steel and a flux core comprising 14 weight percent of the total electrode, said core material consisting essentially of about 16.4 weight percent Fe; 45.0 weight percent $TiO_2$; 19.3 weight percent FeMnSi; 6.4 weight percent MnO; 2.5 weight percent NaF; 5.2 weight percent Al—Mg; 2.6 weight percent $K_2SiO_4$; 2.6 weight percent $Al_2O_3$.

8. A consumable wire electrode for carbon dioxide containing gas shielded arc welding comprising a hollow sheath of mild steel and a flux core comprising: 12 weight percent of the total electrode, said core material consisting essentially of about 3.0 weight percent NaF; 2.5 weight percent Fe; 52.5 weight percent $TiO_2$; 22.5 weight percent FeMnSi; 7.5 weight percent MnO; 6.0 weight percent Al—Mg; 3.0 weight percent $K_2SiO_4$; and 3.0 weight percent $Al_2O_3$.

* * * * *